United States Patent [19]
Dershem

[11] Patent Number: 5,489,641
[45] Date of Patent: * Feb. 6, 1996

[54] FREEZE RESISTANT DIE-ATTACH COMPOSITIONS

[75] Inventor: Stephen M. Dershem, San Diego, Calif.

[73] Assignee: Quantum Materials, San Diego, Calif.

[*] Notice: The portion of the term of this patent subsequent to Oct. 25, 2011, has been disclaimed.

[21] Appl. No.: 23,595

[22] Filed: Feb. 26, 1993

[51] Int. Cl.$^6$ .............. C08K 3/08; C08K 5/09; H01B 1/02
[52] U.S. Cl. .......... 524/439; 524/440; 524/780; 252/511; 252/512; 252/514; 252/518
[58] Field of Search .................. 524/439, 440, 524/780; 252/511, 512, 514, 518; 528/422, 423, 93, 119, 120

[56] References Cited

U.S. PATENT DOCUMENTS

| | | | |
|---|---|---|---|
| 4,110,364 | 8/1978 | Gaku et al. | 528/322 |
| 4,401,776 | 8/1983 | Munk | 523/443 |
| 4,552,690 | 11/1985 | Ikeguchi et al. | 252/512 |
| 4,604,452 | 8/1986 | Shimp | 528/422 |
| 4,608,434 | 8/1986 | Shimp | 528/422 |
| 4,709,008 | 11/1987 | Shimp | 528/422 |
| 4,740,343 | 4/1988 | Gaku et al. | 524/439 |
| 4,740,584 | 4/1988 | Shimp | 528/422 |
| 4,785,075 | 11/1988 | Shimp | 528/422 |
| 4,839,442 | 6/1989 | Craig | 528/422 |
| 4,847,233 | 7/1989 | Shimp | 502/171 |
| 4,861,823 | 8/1989 | Qureshi | 524/606 |
| 4,946,928 | 8/1990 | Jackson et al. | 528/423 |
| 4,999,699 | 3/1991 | Christie et al. | 357/65 |
| 5,002,818 | 3/1991 | Licari et al. | 428/209 |
| 5,150,195 | 9/1992 | Nguyen | 357/72 |
| 5,155,066 | 10/1992 | Nguyen | 437/209 |
| 5,358,992 | 10/1994 | Dershem et al. | 524/439 |
| 5,371,178 | 12/1994 | Nguyen et al. | 252/512 |

OTHER PUBLICATIONS

D. A. Shimp and W. M. Craig, Jr., entitled New Liquid Dicyanate Monomer for Rapid Impregnation of Reinforcing Fibers, 34th International Sampe Symposium, 1989.
Hi-Tek Polymers, entitled ArcoCy cyanate Ester Safety and Handling Bulletin, ArcoCy and Handling, May 1989.
Shimp, D. A., Thermal Performance of Cyanate Functional Thermosetting Resins, pp. 41–46.
AroCy L–10 Cyanate Ester Monomer, Rhone–Poulenc (4 pg. brochure) dated Oct. 9, 1990.
AroCy Cyanate Ester Resins Chemistry, Properties and Applications, D. A. Shimp, J. R. Christenson and S. J. Ising, Table of Contents, Introduction, pp. 1–9, and 35–36 (Bibliography), dated May, 1991.

*Primary Examiner*—Tae H. Yoon
*Attorney, Agent, or Firm*—Brueggemann & Clark Pretty, Schroeder; Stephen E. Reiter

[57] ABSTRACT

In accordance with the present invention, there is provided a novel composition for attaching a semiconductor device to a substrate. The invention composition comprises liquid monomer vehicle comprising at least two monomers wherein at least one monomer is a polycyanate ester monomer, electrically conductive filler, and a curing catalyst. Compositions of the invention remain homogeneous at room temperature for at least eight hours.

13 Claims, No Drawings

5,489,641

FREEZE RESISTANT DIE-ATTACH COMPOSITIONS

FIELD OF THE INVENTION

The present invention relates generally to the field of adhesives, and more particularly to die attach compositions for attaching semiconductor devices to carrier substrates.

BACKGROUND OF THE INVENTION

Cyanate ester resins, developed during the 1980s, join epoxy resins and bismaleimide resins as the third major class of thermosetting resins. Polycyanurates or cross-linked cyanate resins are prepared by the cyclopolymerization of aromatic cyanate esters. These cyanate esters are bisphenol derivatives containing a plurality of cyanate functional groups. When heated, the cyanate functionality undergoes exothermic trimerization to form substituted triazine rings. Subsequent curing produces the thermosetting resin.

Cyanate esters are currently employed in rapidly curing adhesive compositions used to bond semiconductor devices or chips, also known as dice, to carrier substrates. Such adhesive compositions include, in addition to the cyanate ester, thermally and/or electrically conductive filler and a curing catalyst. These adhesive compositions have eliminated many of the deficiencies inherent in epoxy adhesives and polyimide adhesives such as low glass transition temperature, high degree of ionic contamination, retention of solvent and lengthy cure. However, cyanate ester containing attach paste compositions presently available exhibit some deficiency with respect to homogeneity, i.e. such pastes have a tendency to become non-homogeneous at ambient temperature.

BRIEF DESCRIPTION OF THE INVENTION

In accordance with the present invention, we have developed a novel composition for attaching a semiconductor device to a substrate. The invention composition comprises liquid monomer vehicle comprising at least two monomers wherein at least one monomer is a polycyanate ester monomer, electrically conductive filler and a curing catalyst. Compositions of the invention remain homogeneous at room temperature for at least eight hours.

DETAILED DESCRIPTION OF THE INVENTION

In accordance with the present invention there is provided a paste composition for attaching a semiconductor device to a substrate, said composition comprising liquid monomer vehicle comprising at least two monomers wherein at least one monomer is a polycyanate ester monomer, electrically conductive filler, and a metal catalyst.

Examples of electrically conductive fillers which may be employed in the present invention include, for example, silver, nickel, copper and aluminum fillers as well as alloys of such metals. Both powder and flake forms of filler may be used in the attach paste compositions of the present invention. The preferred thickness of flake is under 2 microns with a dimension of about 20 to about 25 microns. Flake employed herein preferably has a surface area of about 0.15 to 5.0 m$^2$/g and a tap density of 0.4 to 5.5 g/cc. Powder employed herein preferably has a diameter of about 0.5 to 15 microns.

The die attach paste compositions of the invention employ liquid monomer vehicle comprising at least two monomers wherein at least one monomer is a polycyanate ester monomer. It has been found that polycyanate ester monomer performs a vital role in die attach paste compositions, particularly when a paste is used in hermetic packages. It is well known that the cyanate function reacts readily with moisture. This reaction is used to provide a powerful gettering action on residual moisture left in a hermetic package after it has been sealed.

The monomer vehicle of the present invention is liquid at ambient temperature. The term "ambient" as used herein refers to temperatures in the range of about 20° C. to about 25° C. A liquid vehicle ensures that paste compositions will not be compromised by monomer crystallization during use but will maintain a homogeneous consistency. While it is possible to heat a sample of paste until all of the monomer is melted, this puts an unreasonable burden on the user. Furthermore, the user may not be able to ascertain when all of the monomer is melted. Use of a non-homogenous paste can result in failures in die attach.

In the present invention, use of a polycyanate ester monomer having a melting point above ambient temperature is not precluded because such a monomer can be combined with one or more other monomers which are selected so that the melting point of the resultant monomer mixture is lowered to provide a liquid monomer vehicle at ambient temperature. Liquid monomer vehicles contemplated herein include vehicles consisting only of liquid monomers; vehicles consisting of solid monomer(s) miscible and/or soluble in liquid monomer(s); and vehicles consisting of solid monomers which, when combined, provide a liquid monomer mixture.

Monomer(s) which may be combined with polycyanate ester monomer is selected based on the following criteria: the monomer(s) should be soluble in or miscible with polycyanate ester monomer and should be non-reactive with polycyanate ester monomer at ambient temperatures, unless such reaction(s) is reversible at temperatures above ambient temperature.

Cyanate ester monomers that can be employed in the present invention contain two or more ring forming cyanate (—O—C≡N) groups which cyclotrimerize to form substituted triazine rings upon heating. Because no leaving groups or volatile byproducts are formed during curing of the cyanate ester monomer, the curing reaction is referred to as addition polymerization. Suitable polycyanate ester monomers that may be used in the present invention include, for example, 1,1-bis(4-cyanatophenyl)methane, 1,1-bis(4-cyanatophenyl)ethane, 2,2-bis( 4-cyanatophenyl)propane, 1,3-bis[2-(4-cyanatophenyl)propyl]benzene, and the like. Polycyanate ester monomers utilized in the present invention may be readily prepared by reacting appropriate dihydric phenols with a cyanogen halide in the presence of an acid acceptor.

Monomers that may be combined with polycyanate ester monomer(s) in the present invention are selected from those monomers which undergo addition polymerization. Such monomers include vinyl ethers, divinyl ethers, diallyl ethers, dimethacrylates, dipropargyl ethers, mixed propargyl allyl ethers, monomaleimides, bismaleimides, and the like. Examples of such monomers include cyclohexanedimethanol monovinyl ether, trisallylcyanurate, 1,1-bis(4-allyloxyphenyl)ethane, 1,1-bis(4-propargyloxyphenyl)ethane, 1,1-bis( 4-allyloxyphenyl-4'-propargyloxyphenyl)ethane, 3-(2, 2-dimethyltrimethylene acetal)-1-maleimidobenzene, 2,2,4- trimethylhexamethylene- 1,6-bismaleimide, 2,2-bis[4-(4-maleimidophenoxy)phenyl]propane, and the like.

Various monomers may be combined to obtain a liquid monomer vehicle. For example, when 1,1-bis(4-cyanatophenyl)ethane, having a melting point of 29° C., and 2,2,4-trimethylhexamethylene-1,6-bismaleimide, having a melting point range of 75° to 125° C., were combined, mixtures containing up to 12 wt. percent bismaleimide were found to remain liquid indefinitely. The lowest melting mixture contained 8 wt. percent bismaleimide and had a melting point of 26.07° C. which is three degrees below the melting point of 1,1-bis(4-cyanatophenyl)ethane. The viscosity of this mixture was lower than that of the pure dicyanate ester. Surprisingly, the thermal stability of polymer derived from this mixture exceeded the thermal stability of the polycyanate ester homopolymer. Thermal stability was determined using thermogravimetric analysis run at a temperature ramp rate of 10° C./minute under an air purge. The decomposition onset temperature for the polymer derived from the mixture was 438° C. whereas the decomposition onset temperature for the homopolymer was 419° C.

When 1,1-bis(4-cyanatophenyl)ethane and 2,2-bis(4-cyanatophenyl)propane, having a melting point of 79° C., were combined, mixtures containing up to 20 wt. percent 2,2-bis(4-cyanatophenyl)propane were found to remain liquid indefinitely at room temperature. These mixtures behaved as supercooled liquids that were more resistant to crystallization than pure 1,1-bis (4-cyanatophenyl) ethane. The lowest melting mixture contained approximately 15 wt. percent 2,2-bis(4-cyanatophenyl)propane and had a melting point of 24.43° C. which is over four degrees below the melting point of 1,1-bis(4-cyanatophenyl)ethane. The viscosity of this mixture was lower than that of pure 1,1-bis(4-cyanatophenyl)ethane. The polymer derived from this mixture also had higher thermal stability than the homopolymer derived from pure 1,1-bis(4-cyanatophenyl)ethane. The decomposition onset temperature for the polymer derived from the mixture was 435° C. which is approximately sixteen degrees higher than the decomposition onset temperature for the homopolymer derived from 1,1-bis(4-cyanatophenyl) ethane.

When 1,1-bis(4-cyanatophenyl)ethane and 1,1-bis(4-propargyloxyphenyl)ethane, having a melting point of 39° C., were combined, mixtures containing from about 15 to 50 wt percent dipropargyl ether were found to remain liquid indefinitely. A mixture containing 40 wt. percent dipropargyl ether did not crystallize when seeded with crystals from each monomer and stored at 5° C. The viscosity of this mixture was approximately the same as that of the homopolymer derived from 1,1-bis(4-cyanatophenyl)ethane. The thermal stability of polymer derived from this mixture was lower than that of the polycyanate ester homopolymer. The decomposition onset temperature for the polymer derived from the mixture was 355° C. It is believed that the polymerized mixture consists of an interpenetrating network of cyanate and propargyl resins since differential scanning calorimetric studies indicate the presence of two separate cure events. Despite the lower decomposition onset temperature, this mixture is suitable for use for die attach in solder seal hermetic packages since such assemblies are usually processed at 330° C. or lower.

When 1,1-bis(4-cyanatophenyl)ethane and 3-(2,2-dimethyltrimethylene acetal)-1-maleimidobenzene, having a melting point of 106° C., were combined, mixtures containing from about 5 to 30 wt. percent monomaleimide were found to remain liquid indefinitely at room temperature. A mixture containing approximately 25 wt. percent monomaleimide remained liquid even when seeded with crystals from each monomer and stored for several days at 5° C. The viscosity of this mixture was approximately twice that of the pure dicyanate ester. The thermal stability of the polymer derived from this mixture was somewhat lower than that of the polycyanate ester homopolymer. The decomposition onset temperature for the polymer derived from the mixture was 395° C., or about 24 degrees lower than the decomposition onset temperature of the polycyanate ester homopolymer. Despite the lower temperature, the mixture is suitable for use in solder seal hermetic, microelectronic packages because the highest temperature required to seal these packages is far lower than the decomposition temperature for the polymer derived from the mixture.

It was found that the melting point of 1,1-bis(4-propargyloxyphenyl)ethane could be significantly depressed by the partial reduction of the propargyl function to allyl. Approximately 20% of the propargyl groups had to be reduced to allyl in order for the product to be a room-temperature-stable liquid. It was also necessary to keep the total fraction of allyl groups below 30% since the allyl moiety does not produce an independent cure. When the 20/80 allyl/propargyl monomer was combined with 1,1-bis(4-cyanatophenyl)ethane, it was found that from 5 to 100 wt. percent allyl/propargyl monomer provided stable liquids at room temperature. Mixtures containing at least 30% of the 20/80 allyl/propargyl monomer did not freeze at 5° C., even when seeded with crystals of 1,1-bis(4-cyanatophenyl)ethane. The viscosity of the mixture was approximately the same as that of the dicyanate ester. The onset for thermal degradation in air was 383° C. for polymer derived from the mixture containing 30% allyl/propargyl monomer. This thermal stability was considered more than adequate for reasons stated above.

Cyclohexanedimethanol monovinyl ether, a liquid, is miscible in all proportions with 1,1-bis(4-cyanatophenyl)ethane. The vinyl ether monomer significantly depresses the viscosity of the dicyanate ester monomer when present at a concentration of at least 5 wt. percent. The presence of just 5 wt. percent monovinyl ether monomer also enhances the supercooling behavior of the dicyanate ester monomer. Mixtures containing at least 25 wt. percent monovinyl ether monomer did not freeze at 5° C. even when seeded with crystals of the dicyanate ester monomer. The decomposition onset temperature in air is 363° C. for polymer derived from a mixture consisting of 20 wt. percent monovinyl ether monomer and 80 wt. percent dicyanate ester monomer. This polymer is also suitable for use for die attach in solder seal packages.

When 1,1-bis(4-cyanatophenyl)ethane and 2,2-bis[4-(4-maleimidophenoxyphenyl]propane, having a melting range of 110° to 170° C., were combined, mixtures containing at least 20 wt. percent bismaleimide monomer remained fluid at 5° C. even when seeded with crystals of the dicyanate ester monomer. The viscosity of a mixture containing approximately 20 wt. percent bismaleimide monomer was about twice that of the pure dicyanate ester monomer. Compositions containing less than 30 wt. percent bismaleimide monomer were found to be suitable for use in die attach pastes. The decomposition onset temperature for a mixture consisting of 15 wt. percent bismaleimide monomer and 85 wt. percent dicyanate ester monomer was 431° C., which is approximately the same as the polycyanate ester homopolymer.

When 1,1-bis(4-cyanatophenyl)ethane and 2,2-bis(4-methacryloxy)propane, having a melting range of 72°–74° C., were combined, mixtures containing at least 25 wt. percent dimethacrylate monomer remained fluid at 5° C. even when seeded with crystals of the dicyanate ester monomer. Mixtures containing only 5 wt. percent dimethacrylate monomer were more resistant to freezing than the dicyanate ester monomer alone. The viscosities of mixtures containing up to 35 wt. percent dimethacrylate monomer were approximately the same as that of the pure dicyanate ester monomer. The onset for thermal decomposition in air for a mixture containing 20 wt. percent dimethacrylate monomer was 409° C., which is only slightly lower than the decomposition onset temperature of the polycyanate ester homopolymer.

Metal catalysts employed in the present invention are metal acetylacetonates which are metal chelates wherein the preferred metal is a transition metal. Examples of operative metals are cobalt, manganese, tin, zinc, copper and nickel, all in the divalent state; manganese, iron, cobalt and aluminum, all in the trivalent state; and tetravalent titanium. The most preferred metal catalyst is cobalt(III) acetylacetonate.

The attach paste compositions of the invention are prepared by mixing monomer vehicle, filler and catalyst in a planetary mixer under vacuum or in inert atmosphere for about 30 minutes to 1 hour. Thereafter, the homogeneous paste which is obtained is subjected to additional mixing on a three-roll mill for a minimum of fifteen minutes at room temperature. The paste is preferably stored at low temperatures, e.g. −40° C. until needed.

The amount of monomer vehicle, filler and metal catalyst employed in the attach paste compositions of the invention is important if satisfactory attach pastes are to be obtained. Based on the total weight of the attach paste, the monomer vehicle is present in the range of about 8 to about 20 wt. percent; the treated filler is present in the range of about 80 to about 92 wt. percent; and the metal catalyst is present in the range of 50 to about 1500 ppm.

It may be desirable to incorporate one or more additives in attach paste compositions of the invention in order to alter certain characteristics. Examples of such additives include, for example, fumed silica and certain antioxidants.

Incorporation of a small amount of fumed silica may be beneficial in that it reduces the amount of solvent bleed that can occur during the curing process. Specifically, introduction of fumed silica reduces the amount of uncured monomer that wicks out onto the substrate. Minimizing solvent bleed is desirable since excessive spread of monomer can result in contamination of the die being attached to the substrate. The addition of a small amount of fumed silica can also be used to increase the thixotropic index of a paste. This effect is particularly important when low surface area metal fillers are employed in an attach paste. In the absence of fumed silica, such a paste composition may give a "taily dispense", a term referring to a paste that does not break off cleanly from the automatic dispensing head. This results in a tail of paste dragging across a component during the assembly process which makes the component unusable. When fumed silica is incorporated in the paste compositions of the invention, the amount will vary from about 0.2 wt. percent to about 2 wt. percent.

It is well known to those skilled in the art that the thermo-oxidative stability of a high temperature polymer can be improved by the incorporation of an antioxidant. Use of an antioxidant in paste compositions containing high temperature polymers and finely divided silver can be very beneficial. Silver metal can act as an oxidation catalyst and contribute to early thermal degradation. This effect is especially evident when the filler employed is a high surface area silver powder. Moreover, the severity of the problem increases as the solids loading of silver powder increases. For example, thermal degradation onset for a paste loaded with 85 wt. percent silver powder is about 390° C. A paste made with identical ingredients loaded by only 80 wt. percent silver powder had a decomposition onset around 400° C. It is desirable to be able to load the silver content as high as possible in order to obtain the highest possible thermal and electrical conductivity. Incorporation of from about 0.5 to about 1.0 wt. percent antioxidant can substantially improve the thermal stability of attach paste compositions containing silver powder. The onset of thermal decomposition for an attach paste containing 85 wt. percent silver powder and 0.5 wt. percent antioxidant was 410° C. The onset for thermal decomposition of a control paste containing no antioxidant was approximately 20° C. lower. Antioxidants that are suitable for use in the attach paste compositions of the invention include, for example, 4,4'-dioctyldiphenylamine 3,3'diethyl-5,5'-dinonyldiphenyl amine and the like.

The invention will now be described in greater detail by reference to the following non-limiting Examples.

EXAMPLE I 1,1-Bis(4-hydroxyphenyl)ethane (50.0 g) and 150 ml of dimethylsulfoxide were added to a double-necked 500 ml flask, fitted with a mechanical stirrer and cooled in an ice/water bath. Stirring was continued until all solid material had dissolved. Thereafter, an equivalent of powdered potassium hydroxide was added portionwise to the reaction mixture over a period of one hour with stirring. After the addition of base, 37.25 g of propargyl chloride was added dropwise through a liquid addition funnel over a one hour period. After the addition of propargyl chloride, the ice bath was removed and the solution was stirred for an additional two hours.

The crude bispropargyl ether was recovered by first diluting the reaction mixture with an equal volume of water and then washing the aqueous phase 3× times with methylene chloride. The organic washes were combined and washed once with dilute aqueous base followed by 2× washings with water. The organic phase was dried over magnesium sulfate. Using a rotary evaporator, the solvent was removed by first evaporating under atmospheric pressure and then stripping at reduced pressure and elevated temperature (<80° C.).

The crude ether was distilled using a falling film molecular distillation apparatus using chlorobenzene as a refluxing solvent.

Hydrogenation of the bispropargyl ether was performed in ethanol at room temperature using an atmospheric hydrogenation apparatus and Lindlar's catalyst (1% w/w). Based on hydrogen uptake, hydrogenation was continued until a 20–30% conversion was achieved. Quantitative determination of conversion was followed by means of proton NMR.

Final purification of the mixture of bispropargyl, bisallyl (trace), and propargylallyl ethers of 1,1-bis(4-hydroxyphenyl)ethane was performed by first evaporating solvent by means of a rotary evaporator and then stripping remaining trace solvent by means of two passes through a falling film molecular distillation apparatus using isopropyl alcohol as the refluxing solvent and pressures at or below 0.5 Torr.

EXAMPLE II

3-Nitrobenzaldehyde (100.0 g, 0.622 moles), 75.0 g (0.721 moles) neopentyl glycol, a crystal of p-toluenesulfonic acid and 300 ml of benzene were added to a double-necked 500 ml round bottom flask fitted with a Dean-Stark water trap and a reflux condenser. The reaction mixture was gently refluxed under an inert atmosphere until no more water was collected. Approximately 12.1 ml of water were recovered in a 24 hour period.

The crude product was isolated by evaporation of benzene and recrystallized from isopropyl alcohol to obtain 141.9 g (90.5% yield) of 3-(2,2-dimethyltrimethylene acetal)-1-nitrobenzene.

Potassium formate (85.0 g, 4.72 moles), 85.0 g (4.72 moles) of water, 300 ml of ethanol and 120.0 g (0.506 moles) of 3(2,2-dimethyltrimethylene acetal)-1-nitrobenzene were added to a triple-necked 1 liter round bottom flask fitted with a mechanical stirrer, a reflux condenser and a thermometer. The reaction mixture was stirred and heated in a water bath where the temperature was gradually increased. When the temperature reached 70° C., 0.2 g of 10% Pd/C catalyst was added to the reaction mixture. After the initial exotherm subsided, an additional 1.00 g 10% Pd/C catalyst was added and the reaction mixture was heated for an additional 2 hours at 70° C.

The crude product was isolated by filtration of the reaction mixture followed by evaporation of solvent. The recovered product was then diluted with methylene chloride and washed twice with 100 ml of water. The organic phase was separated and dried over magnesium sulfate. Solvent was then evaporated to obtain 101.5 g (96.9% yield) of 3-(2,2-dimethyltrimethylene acetal)-1-aminobenzene as a light yellow solid.

Maleic anhydride (45.0 g, 0.459 moles) and 200 ml of t-butylmethyl ether were added to a triple-necked 500 ml round bottom flask fitted with a mechanical stirrer, reflux condenser and a powder addition funnel. The mixture was stirred at room temperature until all solids were dissolved. Thereafter, 90.0 g (0.435 moles) of 3-(2,2-dimethyltrimethylene acetal)-1-aminobenzene, contained in the powder addition funnel, was added to the reaction mixture with stirring over a one-half hour period. After the addition was complete, stirring was continued for one hour. The final reaction mixture was a light yellow slurry.

The reaction product was isolated using suction filtration and air dried overnight. A light yellow solid was obtained (120.7 g, 91.0% yield).

Acetic anhydride (150.0 g, 1.47 moles), 26.9 g (0.328 moles) sodium acetate, 3.30 g (0.033 moles) triethylamine and 100.0 g (0.328 moles) of the reaction product described in the preceding paragraph were added to a double-necked 500 ml round bottom flask equipped with a reflux condenser and a thermometer. The reaction mixture was stirred in an inert atmosphere at 70° C. for a period of 2 hours.

The crude product was precipitated from solution by the addition of 300 ml of ice water and collected by suction filtration. Two additional washings with ice water (100 ml) followed by filtration were necessary to remove trace anhydride. The recovered material was dried under vacuum overnight to yield 89.6 g (95.2% yield) of 3-(2,2-dimethyltrimethylene acetal)-1-maleimidobenzene.

EXAMPLE III

An attach paste was prepared with the following materials in the indicated wt. percentages:

| | |
|---|---|
| 1,1-bis(4-cyanatophenyl)ethane | 12.72 |
| 2,2-bis(4-cyanatophenyl)propane | 2.25 |
| cobaltic(III) acetylacetonate | 0.023 |
| silver flake | 85.03 |

The silver flake comprised 6.80 wt. percent flake having a surface area of 1.91 $m^2/g$, 17.01 wt. percent flake having a surface area of 0.65 $m^2/g$ and 40.81 wt. percent flake having a surface area of 0.25 $m^2/g$.

The cyanate ester monomers were heated and stirred until a homogeneous liquid was obtained. The remaining ingredients were mixed with this liquid in a ceramic vessel until the solids appeared to be thoroughly wetted by the comonomer vehicle. The mixture was then processed on a three roll mill until a smooth, homogeneous paste was obtained.

The paste had a 10 rpm viscosity of $61 \times 10^3$ centipoise and a thixotropic index of 10.81. This paste could be cured in 5 minutes at 240° C. to yield a tough adhesive substantially free of voids. The post cure adhesion was at least 2600 psi and did not degrade even after 100 temperature cycles between −65° and 150° C. The radius of curvature for this paste was found to be 4.5±0.3 meters. Any radius of curvature greater than 1.0 meters is generally recognized in the art as characteristic of a functional attach paste.

EXAMPLE IV

An attach paste was prepared with the following materials in the indicated wt. percentages:

| | |
|---|---|
| 1,1-bis(4-cyanatophenyl)ethane | 10.8 |
| 2,2-bis(4-cyanatophenyl)propane | 1.9 |
| cobaltic(III) acetyl acetone | 0.02 |
| fumed silica | 0.2 |
| silver powder | 87.10 |

The fumed silica is available as Aerosil 805 from Meta Metallurgical Corporation, South Plainfield, N.J. The silver powder comprised 24.9 wt. percent powder having a surface area of 0.67 $m^2/g$, 33.2 wt. percent powder having a surface area of 1.29 $m^2/g$ and 29.0 wt. percent powder having a surface area of 1.96 $m^2/g$.

The cyanate ester monomers were heated and stirred together to yield a homogeneous liquid. The solid ingredients were then added to this liquid and the mixture was thoroughly stirred until the solids were completely wetted by the liquid phase. The paste was then made homogeneous by means of three roll milling. The viscosity of the paste after milling was $175 \times 10^3$ centipoise at 10 rpm, and the thixotropic index was 9.81.

The paste was used to attach 500 $mil^2$ silicon dice to alumina substrates. The paste cured in 5 minutes at 240° C. to yield a tough nearly void-free bond. The tensile strength of this bond exceeded 2600 psi and was found to be unchanged even after 100 temperature cycles between −65° and 150° C. The radius of curvature measured for this paste was 8.3+1.8 meters.

While the invention has been described in detail with reference to certain preferred embodiments thereof, it will be understood that modifications and variations are within the spirit and scope of that which is described and claimed.

That which is claimed is:

1. A composition for attaching a semiconductor device to a substrate comprising:

8 to 20 wt. percent monomer vehicle comprising at least two monomers, wherein at least one monomer is a polycyanate ester monomer, and wherein said monomer vehicle is free of solvent;

80 to 92 wt. percent electrically conductive filler; and 50 to 1500 ppm metal catalyst;

wherein said monomer vehicle is liquid under ambient conditions.

2. A composition according to claim 1 wherein said liquid monomer vehicle is selected from:

vehicles consisting essentially of liquid monomers, vehicles consisting essentially of solid monomer(s) miscible and/or soluble in liquid monomer(s), or vehicles consisting essentially of solid monomers which, when combined, provide a liquid monomer mixture.

3. A composition according to claim 2 wherein said liquid monomer vehicle consists essentially of liquid monomers.

4. A composition according to claim 2 wherein said liquid monomer vehicle consists essentially of solid monomer(s) miscible and/or soluble in liquid monomer(s).

5. A composition according to claim 2 wherein said liquid monomer vehicle consists essentially of solid monomers which, when combined, provide a liquid monomer mixture.

6. A composition for attaching a semiconductor device to a substrate comprising:

13 to 20 wt. percent monomer vehicle comprising 1,1bis(4-cyanatophenyl)ethane(I) and 2,2-bis(4-cyanatophenyl)propane(II), wherein said monomer vehicle is free of solvent;

80 to 87 wt. percent silver filler; and 50 to 500 ppm cobalt acetylacetonate.

7. A composition according to claim 6 wherein said monomers comprise from about 80 to about 95 wt. percent (I) and from about 5 to about 20 wt. percent (II), with the combined percentages representing total wt. percent monomer vehicle.

8. A composition according to claim 1 wherein additional monomer is selected from the group consisting of vinyl ethers, divinyl ethers, propargyl allyl ethers, monomaleimides, bismaleimides and mixtures of any two or more such monomers.

9. A composition according to claim 4 wherein said liquid monomer vehicle consists essentially of 1,1-bis(4-cyanatophenyl)ethane and cyclohexanedimethanol monovinyl ether.

10. A composition according to claim 5 wherein said liquid monomer vehicle consists essentially of 1,1-bis(4-cyanatophenyl)ethane and 1,1-bis(propargyloxyphenyl)ethane.

11. A composition according to claim 5 wherein said liquid monomer vehicle comprises at least one monomer selected from 2,2,4-trimethylhexamethylene-1,6-bismaleimide, 1,1-bis(4-propargyloxyphenyl)ethane, 3-(2,2-dimethyltrimethylene acetal)-1-maleimidobenzene or 2,2-bis[4-(4-maleimidophenoxy)-phenyl]propane and 1,1-bis(4-cyanatophenyl)ethane.

12. A composition according to claim 5 wherein said liquid monomer vehicle comprises 2,2-bis(4-cyanatophenyl)propane and 1,1-bis(4-cyanatophenyl)ethane.

13. A composition according to claim 1 wherein additional monomer is selected from diallyl ethers or dipropargyl ethers.

* * * * *